US012265960B2

(12) United States Patent
Moy et al.

(10) Patent No.: US 12,265,960 B2
(45) Date of Patent: Apr. 1, 2025

(54) SYSTEMS AND METHODS FOR CROSS-ECOSYSTEM AGGREGATION OF ASSETS USING DISTRIBUTED LEDGERS

(71) Applicant: JPMORGAN CHASE BANK, N.A., New York, NY (US)

(72) Inventors: Christine Moy, New York, NY (US); Tyrone Lobban, London (GB); Keerthi Moudgal, Brooklyn, NY (US); Stuart Hunter, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 195 days.

(21) Appl. No.: 17/087,337

(22) Filed: Nov. 2, 2020

(65) Prior Publication Data
US 2021/0209585 A1 Jul. 8, 2021

Related U.S. Application Data

(60) Provisional application No. 62/929,543, filed on Nov. 1, 2019.

(51) Int. Cl.
*G06Q 20/36* (2012.01)
*G06Q 20/40* (2012.01)

(52) U.S. Cl.
CPC ....... *G06Q 20/3678* (2013.01); *G06Q 20/401* (2013.01); *G06Q 2220/00* (2013.01)

(58) Field of Classification Search
None
See application file for complete search history.

(56) References Cited

U.S. PATENT DOCUMENTS

| | | | | |
|---|---|---|---|---|
| 11,334,876 | B2* | 5/2022 | Yantis | G06F 21/602 |
| 2019/0347628 | A1* | 11/2019 | Al-Naji | G06Q 20/0658 |
| 2019/0370792 | A1* | 12/2019 | Lam | H04L 9/085 |
| 2020/0042988 | A1* | 2/2020 | Snow | G06Q 20/381 |
| 2021/0012335 | A1* | 1/2021 | Zhu | G06Q 20/401 |
| 2022/0076246 | A1* | 3/2022 | Griffin | G06Q 20/3678 |
| 2022/0138748 | A1* | 5/2022 | Millar | G06Q 40/04 705/75 |
| 2023/0046268 | A1* | 2/2023 | Connor | G06Q 20/02 |

OTHER PUBLICATIONS

"Maizels Noah, Exploring Cross Chain Asset Technologies: CATA, CDEX, and CDAT, Oct. 15, 2019, Wanchain" (Year: 2019).*

* cited by examiner

*Primary Examiner* — Neha Patel
*Assistant Examiner* — Nicholas K Phan
(74) *Attorney, Agent, or Firm* — GREENBERG TRAURIG LLP

(57) ABSTRACT

A gateway interfacing with multiple distributed ledger networks may receive, from a buyer on a first distributed ledger network, a request to purchase an asset in exchange for a cash token, the asset being sold by a seller on a second distributed ledger network and an entry on the second distributed ledger network, and the cash token is an entry on the first distributed ledger network; communicate the request to the seller; receive acceptance of the request from the seller; transfer the asset to an electronic wallet for the buyer by updating ownership of the asset on the second distributed ledger network and on the first distributed ledger network; and transfer the cash token to an electronic wallet for the seller by updating ownership of the cash token on the second distributed ledger network and on the first distributed ledger network.

15 Claims, 2 Drawing Sheets

SYSTEMS AND METHODS FOR CROSS-ECOSYSTEM AGGREGATION OF ASSETS USING DISTRIBUTED LEDGERS

RELATED APPLICATIONS

This application claims priority to, and the benefit of, U.S. Provisional Patent Application Ser. No. 62/929,543 filed Nov. 1, 2019, the disclosure of which is hereby incorporated, by reference, in its entirety.

BACKGROUND OF THE INVENTION

1. Field of the Invention

Embodiments generally relate to systems and methods for cross-ecosystem aggregation of assets using distributed ledgers.

2. Description of the Related Art

A holder of an asset that is associated with a first distributed ledger may wish to purchase or exchange that asset with an asset associated with a first distributed ledger. Due to the different types of distributed ledgers, it may be difficult to exchange the assets.

SUMMARY OF THE INVENTION

Systems and methods for cross-ecosystem aggregation of assets using distributed ledgers are disclosed. In one embodiment, in a gateway interfacing with a plurality of distributed ledger networks comprising at least one computer processor, a method for cross-ecosystem aggregation of assets using distributed ledgers may include: (1) receiving, from a buyer of an asset participating on a first distributed ledger network, a request to purchase the asset in exchange for a cash token, the asset being sold by a seller participating on a second distributed ledger network and written as an entry on the second distributed ledger network, and the cash token is written as an entry on the first distributed ledger network; (2) communicating the request to the seller; (3) receiving acceptance of the request from the seller; (4) transferring the asset to an electronic wallet for the buyer by updating ownership of the asset on both the second distributed ledger network and on the first distributed ledger network; and (5) transferring the cash token to an electronic wallet for the seller by updating ownership of the cash token on both the second distributed ledger network and on the first distributed ledger network.

In one embodiment, the entry for the asset may be signed by the second distributed ledger network.

In one embodiment, the entry for the cash token may be signed by the first distributed ledger network.

In one embodiment, the first distributed ledger network or the second distributed ledger network may include a plurality of nodes, and each node may be associated with an asset in a real estate portfolio.

In one embodiment, the method may further include redeeming the cash token for fiat currency.

In one embodiment, the asset may include an energy credit, a carbon offset, environmental data, weather data, etc.

According to another embodiment, a system for cross-ecosystem aggregation of assets using distributed ledgers may include a first distributed ledger network, a second distributed ledger network, and a gateway communicating with the first distributed ledger network and the second distributed ledger network. The gateway may receive, from a buyer of as asset participating on the first distributed ledger network, a request to purchase the asset in exchange for a cash token, the asset being sold by a seller participating on the second distributed ledger network and written as an entry on the second distributed ledger network, and the cash token may be written as an entry on the first distributed ledger network; may communicate the request to the seller; may receive acceptance of the request from the seller; may transfer the asset to an electronic wallet for the buyer by updating ownership of the asset on both the second distributed ledger network and on the first distributed ledger network; and may transfer the cash token to an electronic wallet for the seller by updating ownership of the cash token on both the second distributed ledger network and on the first distributed ledger network.

In one embodiment, the entry for the asset may be signed by the second distributed ledger network.

In one embodiment, the entry for the cash token may be signed by the first distributed ledger network.

In one embodiment, the first distributed ledger network or the second distributed ledger network may include a plurality of nodes, and each node may be associated with an asset in a real estate portfolio.

In one embodiment, the seller may redeem the cash token for fiat currency.

In one embodiment, the asset may include an energy credit, a carbon offset, environmental data, weather data, etc.

According to another embodiment, a system for cross-ecosystem aggregation of assets using distributed ledgers may include a first distributed ledger network, a second distributed ledger network, a gateway communicating with the first distributed ledger network and the second distributed ledger network, and an online marketplace in communication with the gateway. The gateway may receive, via the online marketplace and from a buyer of an asset, a request to purchase the asset in exchange for a cash token, the asset being sold by a seller participating on the second distributed ledger network and written as an entry on the second distributed ledger network, and the cash token may be written as an entry on the first distributed ledger network; may communicate the request to the seller; may receive acceptance of the request from the seller; may transfer the asset to an electronic wallet for the buyer by updating ownership of the asset on the second distributed ledger; and may transfer the cash token to an electronic wallet for the seller by updating ownership of the cash token on the second distributed ledger network.

In one embodiment, the first distributed ledger network or the second distributed ledger network may include a plurality of nodes, and each node may be associated with an asset in a real estate portfolio In one embodiment, the seller may redeem the cash token for fiat currency.

In one embodiment, the asset may include a renewable energy credit, a carbon offset, environmental data, weather data, etc.

BRIEF DESCRIPTION OF THE DRAWINGS

In order to facilitate a fuller understanding of the present invention, reference is now made to the attached drawings in which.

DETAILED DESCRIPTION OF PREFERRED EMBODIMENTS

Systems and methods for cross-ecosystem aggregation of assets using distributed ledgers are disclosed.

Figure 1:
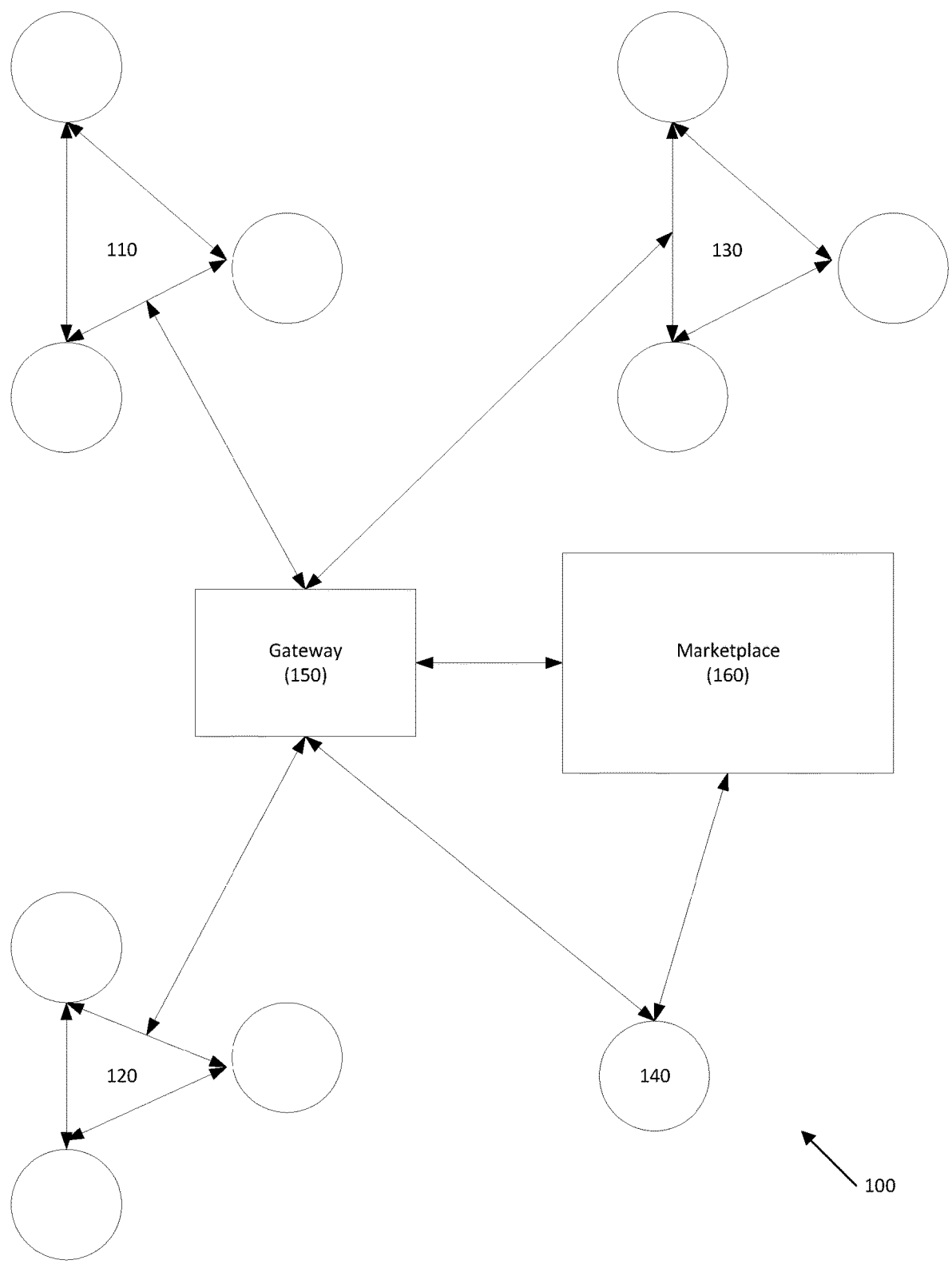
FIG. 1 discloses a system for cross-ecosystem aggregation of assets using distributed ledgers according to one embodiment.

Referring to FIG. 1, a system for cross-ecosystem aggregation of assets using distributed ledgers is disclosed according to one embodiment. System 100 may include a plurality of distributed ledger networks 110, 120, 130, which may record assets. Any suitable asset may be recorded, including, for example, energy assets.

Each distributed ledger network 110, 120, 130 may be independent, and may be based in a different protocol. In one embodiment, distributed ledger networks 110, 120, 130 may be located in the same or different cities, states, regions, countries, etc.

Each distributed ledger network may tokenize, or digitize, the assets such that tokens may represent one or more amounts of the asset. Each token may include one or more unique identifiers for an entry in the distributed ledger that refers to the asset. When a token is retired, the corresponding asset may also retired, or locked, so that it may not be used again.

System 100 may further include gateway 150 that may facilitate communication among distributed ledger networks 110, 120, 130. Examples of suitable gateways are disclosed in U.S. patent application Ser. No. 16/020,473 and U.S. Provisional Patent Application Ser. No. 62/525,600, the disclosures of which are hereby incorporated, by reference, in their entireties.

System 100 may also include marketplace 160, which may be part of one or more of distributed ledger networks 110, 120, 130. In another embodiment, marketplace may be separate from distributed ledger networks 110, 120, 130 and may participate via gateway 150.

In one embodiment, marketplace 160 may facilitate the purchase, sale, and/or exchange of tokens for assets from participants of any of the distributed ledger networks 110, 120, 130, or by non-participants.

For example, the asset may be an energy-based asset.

In one embodiment, marketplace 160 may provide a global marketplace.

In one embodiment, system 100 may further include non-distributed ledger participant 140. Non-distributed ledger participant 140 may hold an asset and/or it may purchase assets from marketplace 160.

Non-distributed ledger participant 140 may interact with gateway 150 directly, and/or it may interact indirectly via marketplace 160.

Embodiments may ensure that the asset recorded onto the distributed ledger is from an authenticated source, thus increasing the trust in the validity of the data. In one embodiment, source authenticity may be provided through source devices or cloud environments digitally signing the data using a cryptographic private key prior to publishing it to the distributed ledger. In one embodiment, the data may be signed by the entity generating the underlying data, the entity measuring the underlying data, or the entity writing the data the distributed ledger.

In embodiments, the data recorded may include energy data, environmental attributes, weather data, etc.

In one embodiment, data sources may have access to a standardized library that enables the generation of public/private key pairs, signing of transactions, validating signatures, and publishing data to the distributed ledger. Users of the system may be able to check the authenticity of the data source and the asset via an indicator showing the same.

Figure 2:
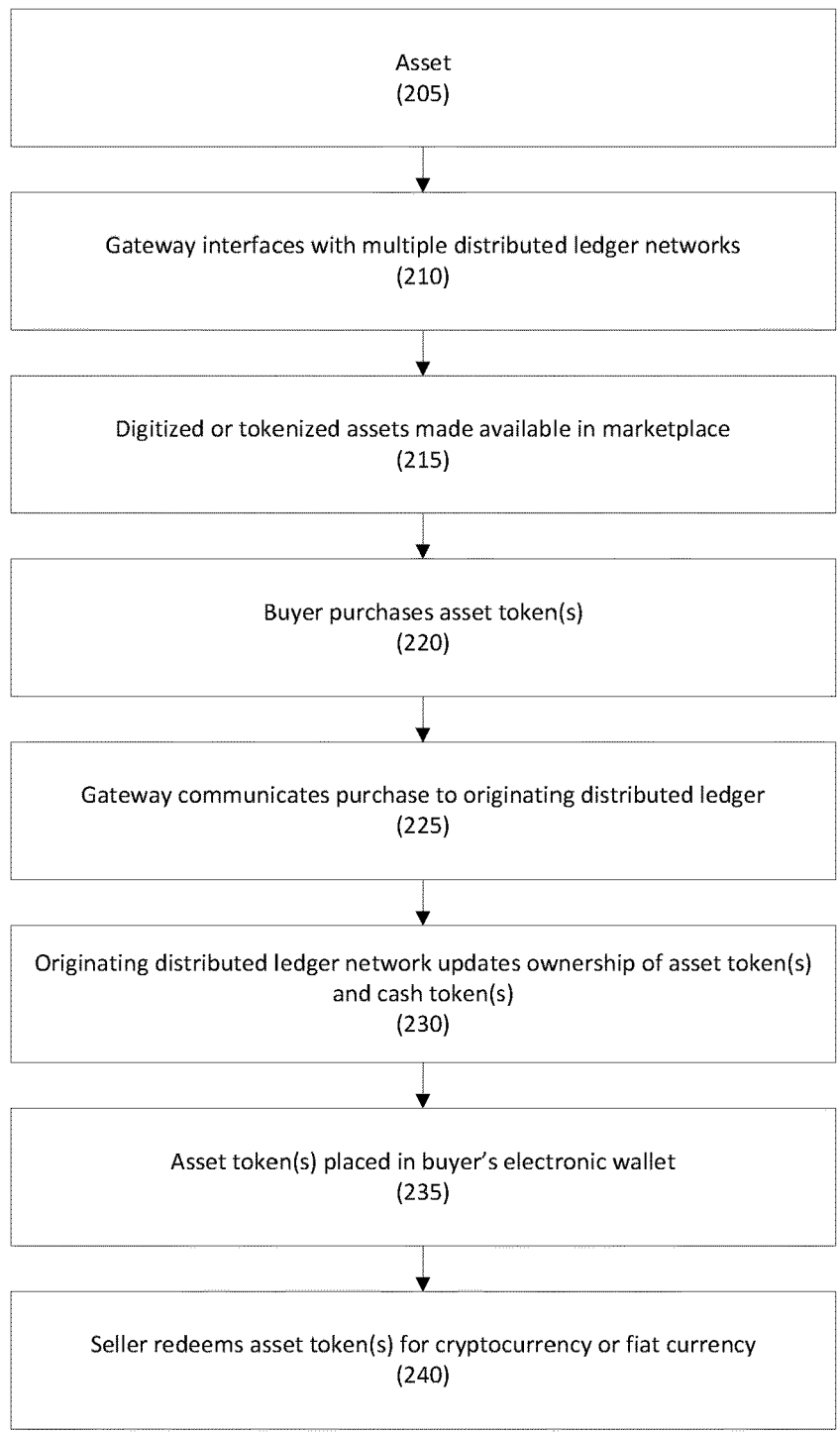
FIG. 2 depicts a method for cross-ecosystem aggregation of assets using distributed ledgers according to one embodiment.

Referring to FIG. 2, a method for cross-ecosystem aggregation of assets using distributed ledgers is disclosed according to one embodiment.

In step 205, an asset may be written to a distributed ledger network, and tokenized or digitized. The tokens may be inextricably linked to their associated records on the distributed ledger that maintains the asset.

In one embodiment, the token representing the asset may be signed by the entity that holds the asset, the entity that generated the token for the asset, and/or the entity that wrote the tokenized data to the distributed ledger.

In one embodiment, multiple distributed ledger networks that include assets may be provided.

In step 210, a gateway may provide an interface among multiple distributed ledger networks. In one embodiment, the gateway may facilitate communication among distributed ledger networks, with non-distributed ledger network participants that may hold assets. In one embodiment, the gateway may provide an interface with a marketplace for buying, selling, or trading assets.

In step 215, the assets may be made available by a distributed ledger participant in one of the distributed ledger networks. In one embodiment, the asset may be made available via the gateway for the marketplace.

In step 220, a buyer may purchase one or more assets in the marketplace. These assets may have originated from one or more distributed ledger networks.

In one embodiment, the buyer may validate the tokens by validating the digital signature(s) associated with the tokens.

In one embodiment, the buyer may verify that the tokens have not been retired by checking the token against a list of active tokens, a list of retired tokens, or by checking the distributed ledger for an indication that the tokens have been retired.

In step 225, the gateway may communicate the purchase to the distributed ledger from where the token(s) originate.

In step 230, the distributed ledger network(s) from where token(s) originated may update the ownership of the token(s) to reflect the purchase. For example, the change of ownership may be written to a distributed ledger, the tokens may be marked as transferred, etc.

In step 235, the token(s) may be placed in the buyer's electronic wallet. In one embodiment the buyer's electronic wallet may be maintained by a separate distributed ledger.

The seller may receive cash token(s) for the sale of the token(s), and the cash token(s) may be placed in the seller's electronic wallet. In one embodiment, the cash token(s) may originate from a separate distributed ledger, and the seller may validate the cash tokens by checking a digital signature on the cash token(s). In one embodiment, the seller may check a list of cancelled cash tokens and/or a list of active cash tokens.

In step 240, the seller may redeem the cash token(s). In one embodiment the seller may redeem the cash token(s) for cryptocurrency, for fiat currency, etc.

Embodiments may increase the assets by providing a global pool of assets that have been generated in or traded in disparate networks. Buyers and sellers may be able to use tokenized fiat cash, cryptocurrency, etc. in order to exchange these assets across different networks in a uniform way.

In one embodiment, the gateway layer may include a translation layer and a cross-chain communication layer that allows assets to be transferred from one network to the other, such as in a cross-chain swap or cross-chain exchange.

In one embodiment, the aggregation functionality may provide a framework for standardizing asset tokens across networks, or may provide a sufficient abstraction layer to ensure that assets can traverse across networks and or be exchanged for tokenized cash in a seamless way.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, Solidity, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for cross-ecosystem aggregation of assets using distributed ledgers, comprising:

receiving, at a gateway in communication with a plurality of distributed ledger networks and an asset marketplace, a notification from a seller of an energy credit asset that is available for purchase on a first distributed ledger network of the plurality of distributed ledger networks written as an energy credit asset token in a seller electronic wallet on the first distributed ledger network that is specific to the first distributed ledger network;

making, by the gateway, the energy credit asset available for purchase on the asset marketplace;

receiving, from the asset marketplace, a purchase of the energy credit asset by a buyer participating on a second distributed ledger network of the plurality of distributed ledger networks, the purchase comprising a cash token from a buyer electronic wallet on the second distributed ledger network that is specific to the second distributed ledger network;

verifying, by the buyer, that the energy credit asset token is active by confirming that the energy credit asset token is on a list of active energy credit asset tokens;

validating, by the seller, the cash token by checking a digital signature on the cash token;

verifying, by the seller, that the cash token is active by confirming that the cash token is on a list of active cash tokens;

communicating, by the gateway, the purchase to the first distributed ledger network in response to the verification that the energy credit asset token is verified as active, the validation of the cash token, and the verification that the cash token is active;

transferring, by the gateway, the energy credit asset token from the electronic wallet for the seller to the electronic wallet for the buyer by updating ownership of the energy credit asset token on both the second distributed ledger network and on the first distributed ledger network; and transferring, by the gateway, the cash token from the electronic wallet for the buyer to the electronic wallet for the seller by updating ownership of the cash token on both the second distributed ledger network and on the first distributed ledger network.

2. The method of claim 1, wherein the energy credit asset token is digitally signed by the first distributed ledger network.

3. The method of claim 1, wherein the cash token is digitally signed by the second distributed ledger network.

4. The method of claim 1, further comprising:
redeeming, by the first distributed ledger network, the cash token for fiat currency.

5. The method of claim 1, wherein the energy credit asset comprises a renewable energy credit asset.

6. A system for cross-ecosystem aggregation of assets using distributed ledgers, comprising:
a first distributed ledger network;
a second distributed ledger network;
an asset marketplace; and
a gateway communicating with the first distributed ledger network, the second distributed ledger network, and the marketplace;
wherein:
the gateway receives a notification from a seller of an energy credit asset that is available for purchase on the first distributed ledger network written as an energy credit asset token in a seller electronic wallet on the first distributed ledger network that is specific to the first distributed ledger network;
the gateway makes the energy credit asset available for purchase on the asset marketplace;
the gateway receives, from the asset marketplace, a purchase of the energy credit asset by a buyer participating on the second distributed ledger network, the purchase comprising a cash token from a buyer electronic wallet on the second distributed ledger network that is specific to the second distributed ledger network;
the buyer verifies that the energy credit asset token is active by confirming that the energy credit asset token is on a list of active energy credit asset tokens;
the seller validates the cash token by checking a digital signature on the cash token;
the seller verifies that the cash token is active by confirming that the cash token is on a list of active cash tokens;
the gateway communicates the purchase to the first distributed ledger network in response to the verification that the energy credit asset token is verified as active, the validation of the cash token, and the verification that the cash token is active;
the gateway transfers the energy credit asset token from the electronic wallet for the seller to the electronic wallet for the buyer by updating ownership of the energy credit asset token on both the second distributed ledger network and on the first distributed ledger network; and
the gateway transfers the cash token from the electronic wallet for the buyer to the electronic wallet for the seller by updating ownership of the cash token on both the second distributed ledger network and on the first distributed ledger network.

7. The system of claim 6, wherein the energy credit asset token is signed by the first distributed ledger network.

8. The system of claim 6, wherein the cash token is signed by the second distributed ledger network.

9. The system of claim 6, further wherein the first distributed ledger network redeems the cash token for fiat currency.

10. The system of claim 6, wherein the energy credit asset comprises a renewable energy credit asset.

11. A non-transitory computer readable storage medium, including instructions stored thereon, which when read and executed by one or more computer processors, cause the one or more computer processors to perform steps comprising:
receiving a notification from a seller of an energy credit asset that is available for purchase on a first distributed ledger network of a plurality of distributed ledger networks written as an energy credit asset token in a seller electronic wallet on the first distributed ledger network that is specific to the first distributed ledger network;
making the energy credit asset available for purchase on an asset marketplace;
receiving a purchase of the energy credit asset from the asset marketplace by a buyer participating on a second distributed ledger network of the plurality of distributed ledger networks, the purchase comprising a cash token from a buyer electronic wallet on the second distributed ledger network that is specific to the second distributed ledger network;
receiving verification from the buyer that the energy credit asset token is active based on the energy credit asset token being on a list of active energy credit asset tokens;
receiving validation from the seller that the cash token is valid based on a digital signature on the cash token;
receiving verification from the seller that the cash token is active based on the cash token being on a list of active cash tokens;
communicating the purchase to the first distributed ledger network in response to the verification that the energy credit asset token is verified as active, the validation of the cash token, and the verification that the cash token is active;
transferring the energy credit asset token from the electronic wallet for the seller to the electronic wallet for the buyer by updating ownership of the energy credit asset token on both the second distributed ledger network and on the first distributed ledger network; and
transferring the cash token from the electronic wallet for the buyer to the electronic wallet for the seller by updating ownership of the cash token on both the second distributed ledger network and on the first distributed ledger network.

12. The non-transitory computer readable storage medium of claim 11, wherein the energy credit asset token is signed by the first distributed ledger network.

13. The non-transitory computer readable storage medium of claim 11, wherein the cash token is signed by the second distributed ledger network.

14. The non-transitory computer readable storage medium of claim 11, further including instructions stored thereon, which when read and executed by one or more computer processors, cause the one or more computer processors to redeem the cash token for fiat currency.

15. The non-transitory computer readable storage medium of claim 11, wherein the energy credit asset comprises a renewable energy credit asset.

* * * * *